United States Patent [19]
Korenek

[11] Patent Number: 5,265,375
[45] Date of Patent: Nov. 30, 1993

[54] METHOD OF TRANSPLANTING LARGE TREES

[76] Inventor: Albert H. Korenek, P.O. Box 45915, Houston, Tex. 77245

[21] Appl. No.: 788,823

[22] Filed: Nov. 7, 1991

[51] Int. Cl.$^5$ ............................................. A01G 23/04
[52] U.S. Cl. ........................................................ 47/76
[58] Field of Search ...................... 47/76, 1.01; 37/2 R

[56] References Cited

U.S. PATENT DOCUMENTS

| | | | |
|---|---|---|---|
| 2,977,716 | 4/1961 | Pearce | 47/76 |
| 2,988,393 | 6/1961 | Logan | 47/76 |
| 4,658,518 | 4/1987 | Korenek | 47/76 |

FOREIGN PATENT DOCUMENTS 0808050  3/1981  U.S.S.R. ................................. 47/76

Primary Examiner—Terry Lee Melius
Assistant Examiner—Joanne C. Downs
Attorney, Agent, or Firm—Vaden, Eickenroht, Thompson, Boulware & Feather

[57] ABSTRACT

A method of moving large trees is disclosed. The method includes digging a trench around the tree at a depth and distance from the trunk of the tree to provide a ball large enough to sustain the tree after it is severed from the ground until the tree can be replanted, placing the side walls of a container in the trench to support the sides of the ball, moving a cutter horizontally under the ball from one side to the other, pushing support members under the ball behind the cutter as the cutter moves under the ball so that when the cutter moves out from under the ball, the ball will be completely supported by support members.

5 Claims, 3 Drawing Sheets

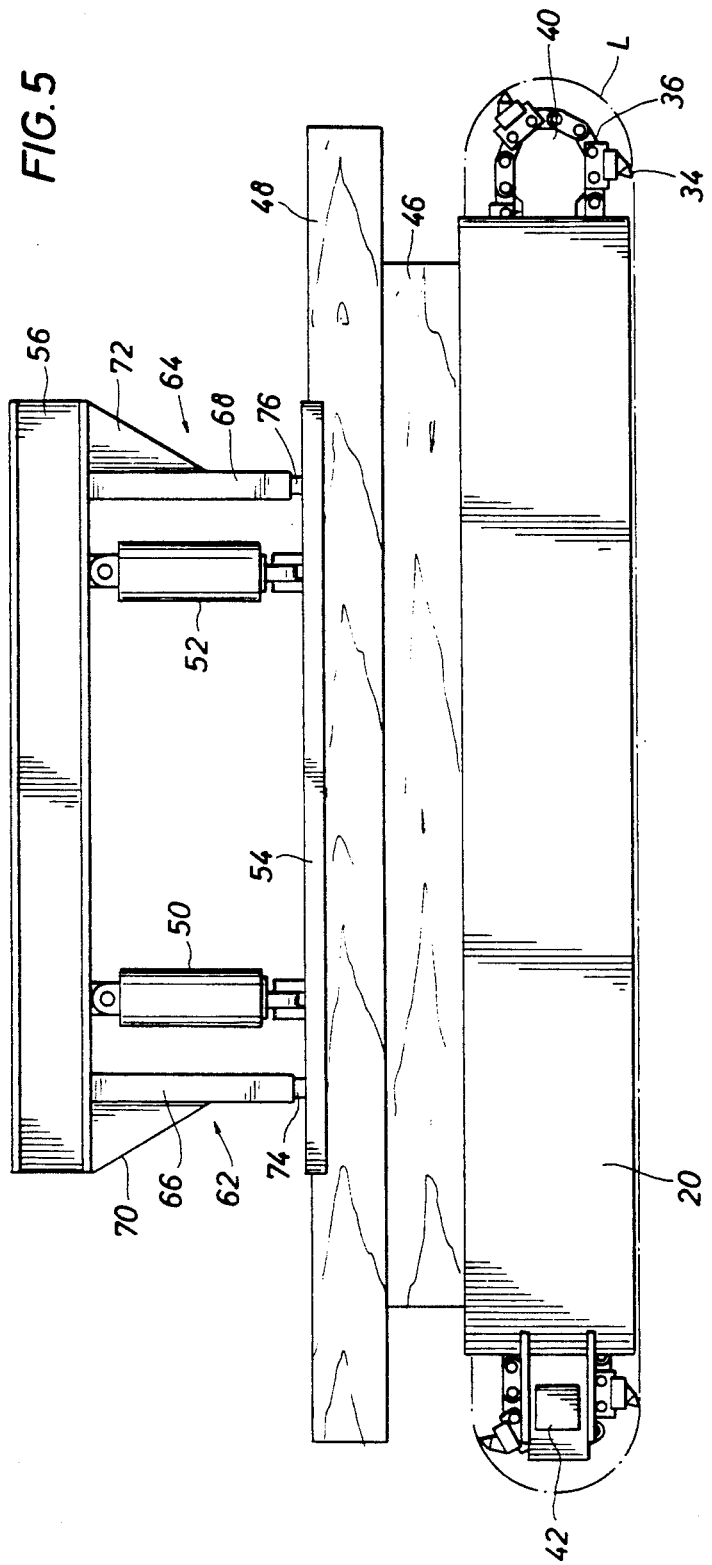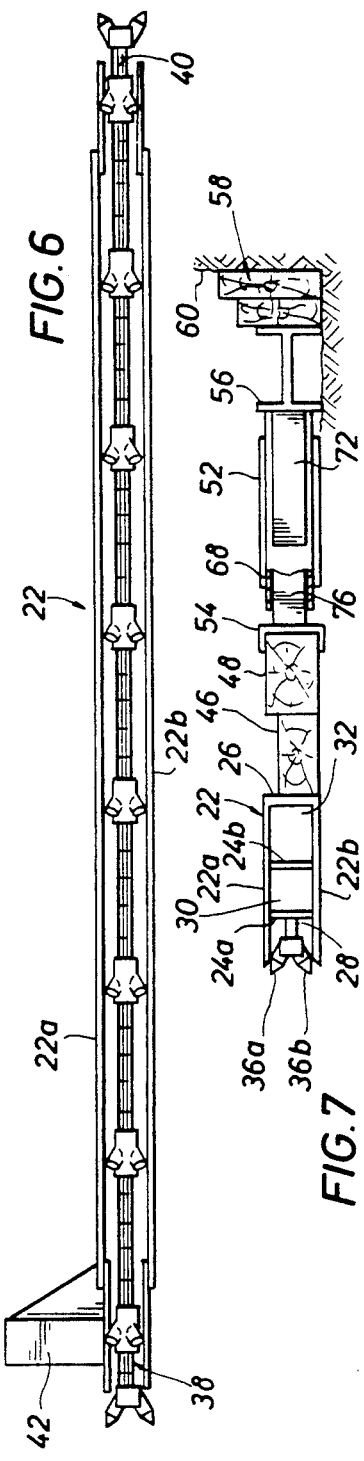

METHOD OF TRANSPLANTING LARGE TREES

This invention relates to a method of transplanting large trees, such as trees 12" in diameter or above.

Until recently, developers of property, particularly commercial property, would clear the location of all the trees, large trees as well as small trees, before the construction began with no thought given to whether or not the trees could in some way be saved. Where a large and particularly desirable tree was located so that it would not be in the way of construction then it might be spared, but on the whole, the idea was to clear the location, build the building or buildings, and then come back and landscape around the buildings using young trees that could be transplanted with a high degree of success. Developers and architects working for the developers have now come to realize that large trees on a property to be developed are worth saving, if at all possible. Usually, the trees are not in the right place on the property and, therefore, to save them, it is necessary to relocate them so that they will not be in the way of construction and yet be there to form part of the landscape around the building when it is completed. One of the problems with this, however, is that heretofore methods of moving such large trees was expensive, labor intensive, and the mortality rate of the trees was high. This was probably because it was very difficult to move these trees with a ball sufficient to support the tree in its new location without damaging the tree's feeder roots to the extent that the tree would die.

In my previously issued U.S. Pat. No. 4,756,259, a method of moving large diameter trees is described, which description is incorporated herein by reference. The method included the steps shown in FIGS. 1-4.

The first step as shown in FIG. 1, is to cut trench 10 around tree 12, the tree to be transplanted. Preferably, the trench is dug at an angle to the vertical so that it slopes inwardly toward the tree from the surface of the ground. Also, in the embodiment shown, the trench is substantially square and root ball 14 is shaped like an inverted truncated pyramid. After the trench has been dug to a depth and at a distance from the tree far enough to provide a root ball sufficient to sustain the tree after it has been removed from the ground, side walls 16a of container 16 are connected together in engagement with the inner wall of the trench, as shown in FIG. 2. Preferably, the length of each container wall is such that the ball is placed slightly in compression, when the side walls are assembled around the ball to hold the roots and the soil to a minimum of relative movement as the ball and tree are moved.

After side walls 16a of the container are in place and connected to each other at the corners to confine the soil in ball 14 from lateral movement, the ball is severed from the ground along a horizontal plane below the side walls, as shown in FIG. 3. This was done by removing only small sections of the soil below ball 14 at any one time. As each section is removed, it is replaced by a support member 16b. The support members consist of large heavy timbers that will form the bottom of container 16 when all of the dirt below the container has been removed and replaced by the support members.

In FIG. 4 all the support members are in place below the ball. In addition, the top of the container and ball 14 are covered with timbers 16c to totally confine the soil in the ball in a rigid container that is strong enough to take the forces imposed thereon as the tree is lifted out of the ground and moved to a new location.

It is an object of this invention to provide an improved method of moving large trees, and in particular to improve the method of severing the bottom of the ball from the ground.

It is another object and feature of this invention to provide a method of severing the ball where the ball is supported at all times as it is being severed.

These and other objects, advantages, and features of this invention will be apparent to those skilled in the art from a consideration of this specification, including the attached drawings and appended claims.

IN THE DRAWINGS

FIG. 5 is a top view of the cutter assembly used to sever the ball from the ground in accordance with this invention.

FIG. 6 is a front view of the cutter of FIG. 5.

FIG. 7 is a side view of the cutter of FIG. 5.

Figure 1:
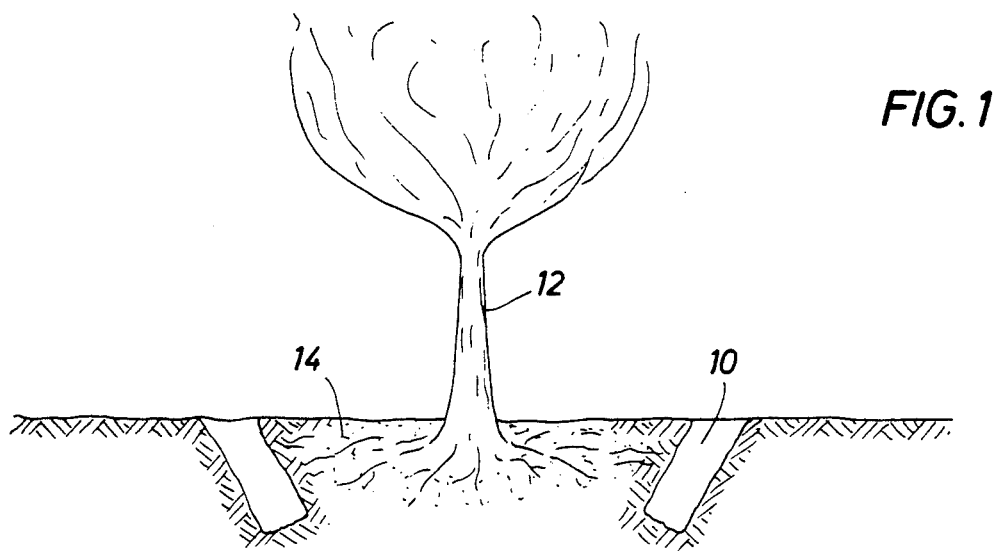
FIGS. 1-4 are vertical sectional views through the ground around a tree showing the steps discussed above of enclosing a ball of soil in a rigid container to be moved with the tree.
Figure 2:
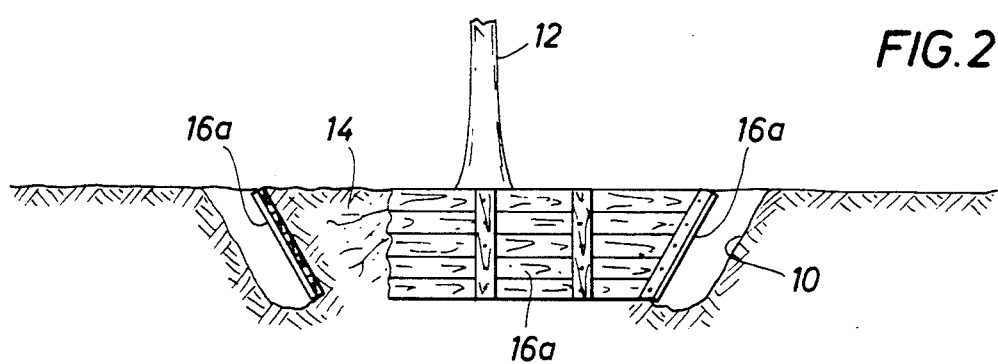
Figure 3:
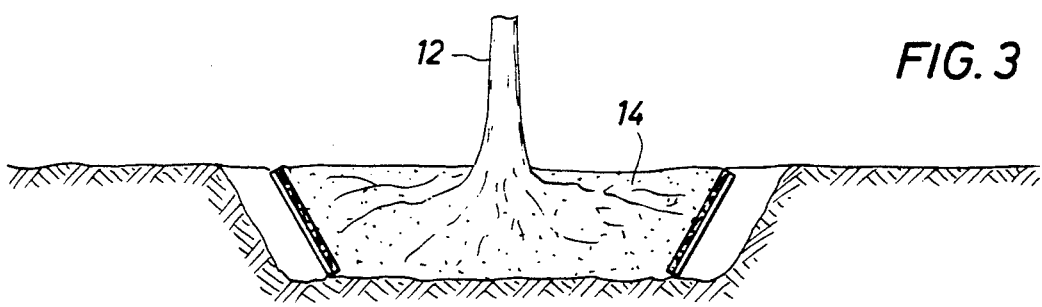

Cutter assembly 20 includes U-shaped housing 22 having top side 22a and a bottom side 22b. Longitudinally extending partitions 24a and 24b support the top and bottom sides of the U-shaped housing. Being U-shaped, one end is open as viewed in FIG. 7 and the other end is closed by end wall 26. Thus, the housing has three chambers 28, 30 and 32. Endless roller chain 34, a portion of which is shown in FIG. 5 carries a plurality of dirt cutting teeth such as teeth 36a and 36b that serve to remove the dirt from beneath the tree. The chain runs in chambers 28 and 32 over sprockets 38 and 40 mounted at opposite ends of the housing. Sprocket 38 is the drive sprocket and it is rotated by motor 42. Sprocket 40 is the idler sprocket, which, of course, simply serves to change the direction of the endless chain. As shown in FIG. 5, cutting teeth 34 extend outwardly beyond the open end of housing 22 slightly so that the teeth will be cutting and removing dirt, roots, etc. slightly ahead of the front edge of housing 20. Line L in FIG. 5 indicates the path of the outer tip of the cutting teeth.

Figure 8:
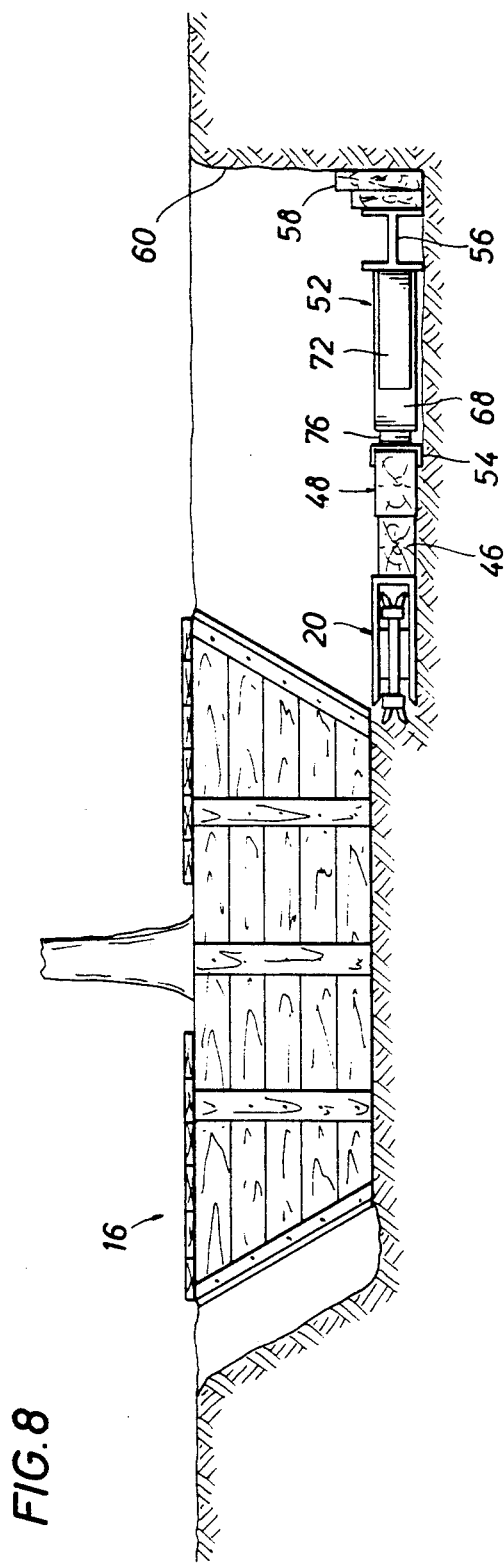
FIG. 8 is a side view of a tree that has been boxed on all four sides and is ready to be severed from the ground showing the cutter assembly in position to begin to sever the ball and at the same time to replace the dirt removed from under the tree with support timbers.

In the practice of the method of this invention, cutting assembly 20 is positioned on the ground at the side of the boxed tree as shown in FIG. 8. Behind the cutting assembly is first support timber 46 and pusher timber 48. A top view of this assembly is shown in FIG. 5. Hydraulic or pneumatic cylinders 50 and 52 are positioned between U-shaped plate 54 and H-beam 56. Shoring 58, as needed, is positioned between H-beam 56 and side wall 60 of the ditch on this side of the tree.

The fluid powered cylinders pushing on timber 48 move the cutting assembly and support timber horizontally against the dirt under the box. As the dirt is removed and the cutting assembly moves further under the box, support timber 46 follows to support the dirt in the box that has been severed from the ground by the cutter. The hydraulic cylinders will have a limited stroke, of course, and each time they are retracted, one or two more support timbers, such as timber 46, are placed between pusher timber 48 and the support timber previously placed in position to be pushed under the bore by pusher timber 48.

Figure 4:
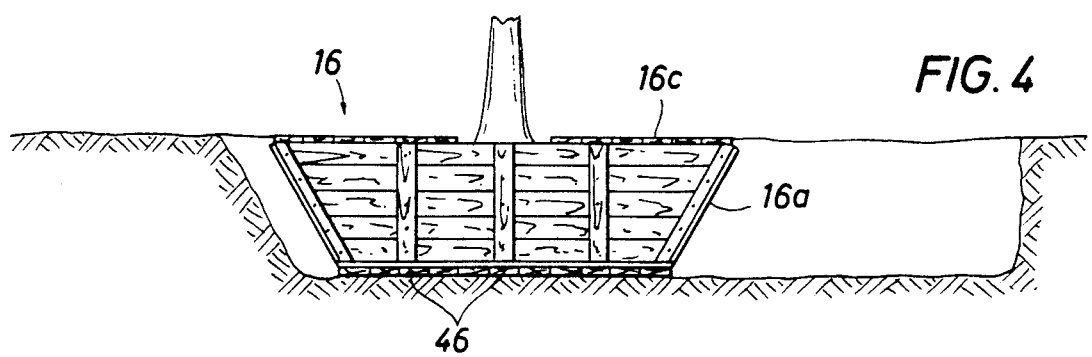
Figure 9:
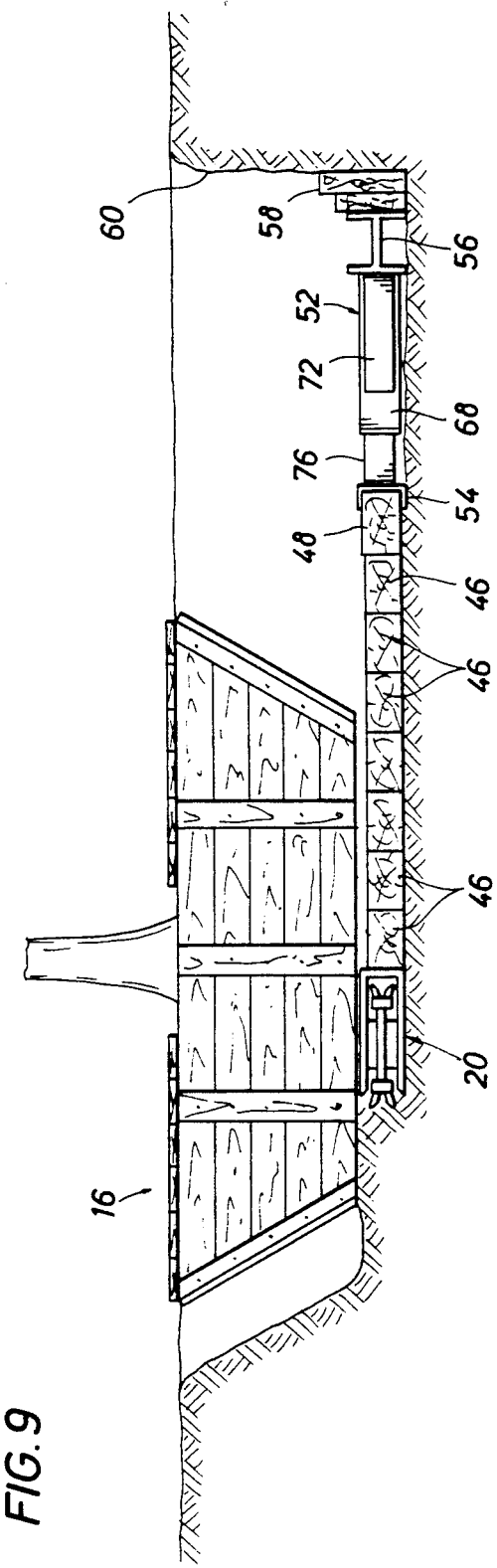
FIG. 9 is a view similar to FIG. 8 showing the cutter past the midway point in the cutting of the ball from the ground with the support timbers following along behind in accordance with this invention.

Consequently, as the cutting assembly is pushed under box 16, the dirt that is removed is continuously replaced by support timbers so that when the cutting assembly moves from beneath the box on the left-hand side, as viewed in FIGS. 8 and 9, the timber adjacent the cutting assembly will be in position to complete the covering of the entire bottom of the box with support timbers such as shown in FIG. 4.

Fluid cylinders 50 and 52 are connected at one end to H-beam 56 and at the other to U-shaped plate 54. H-beam 56 and U-shaped plate 54 are connected by guide assemblies 62 and 64 located outside of the cylinders. The guide assemblies include guide sleeves 66 and 68 that are connected to H-beam 56 and extend perpendicularly therefrom toward U-shaped or channel beam or plate 54. The sleeves are supported by gussets 70 and 72. Guide rods 74 and 76 have one end connected to the channel and extend into sleeves 66 and 68. This arrangement tends to keep the channel and pusher timber 48 moving forwardly evenly as the cylinders push the cutter under the ball.

From the foregoing it will be seen that this invention is one well adapted to attain all of the ends and objects hereinabove set forth, together with other advantages which are obvious and which are inherent to the method.

What is claimed is:

1. A method of moving a large tree comprising digging a trench around the tree at a depth and distance from the trunk of the tree to provide a ball large enough to sustain the tree after it is severed from the ground until the tree can be replanted, placing side walls of a container in the trench to hold the soil in place between the tree and the trench, moving a cutter horizontally under the ball from one side to the other, pushing bottom support members under the ball behind the cutter as the cutter moves under the ball so that when the cutter moves out from under the ball, the ball will be completely supported by the bottom support members.

2. The method of claim 1 in which the bottom support members push the cutter under the ball.

3. A method of enclosing the root ball of a large tree, such as a tree having a trunk diameter of 12" or more, in a box having side walls and a bottom that will hold the dirt in the ball to a minimum of movement as the tree is transplanted to another location, comprising digging a trench around the tree at a depth and distance from the trunk of the tree to provide a ball large enough to sustain the tree after it is severed from the ground until the tree can be replanted, enclosing the sides of the ball with side walls of the box to hold the dirt in the ball from moving laterally, pushing a cutter horizontally under the ball from one side to the other to sever the ball from the ground using bottom support members that are sequentially placed under the ball behind the cutter as the cutter moves out from under the ball so the bottom of the ball will be completely supported by the bottom support members when the ball is severed from the ground.

4. The method of claims 1 or 3 in which the side walls are inclined inwardly and downwardly.

5. The method of claims 1 or 2 in which the ball when severed has the shape of an inverted truncated pyramid.

* * * * *